United States Patent [19]
Thomas et al.

[11] 3,802,155
[45] Apr. 9, 1974

[54] SHRINK WRAPPING SYSTEM

[76] Inventors: Keith N. Thomas, 2515 Manchester Rd., Ann Arbor, Mich. 48104; John Grange, 502 N. Union St., Tecumseh, Mich. 49286

[22] Filed: Sept. 15, 1972

[21] Appl. No.: 289,672

[52] U.S. Cl. ........................ 53/373, 53/30, 156/497
[51] Int. Cl. ...................... B65b 51/20, B65b 53/02
[58] Field of Search ......... 53/30, 184, 373; 156/497

[56] References Cited
UNITED STATES PATENTS
3,340,678 9/1967 Rhodes ................................. 53/372
3,014,320 12/1961 Harrison .......................... 53/184 X
3,486,955 12/1969 Paabo .............................. 156/497 X Primary Examiner—Travis S. McGehee
Attorney, Agent, or Firm—Olsen and Stephenson

[57] ABSTRACT

An improved method and apparatus for wrapping articles with a plastic film that shrinks when heated wherein the shrink characteristic of the film in a restrained state is utilized in the severing of the film simultaneously with bonding layers of the film on opposite sides of the area that is severed. This is accomplished by dynamically forcing hot gas through a restrained area of film to cause it to quickly shrink and tear itself apart.

3 Claims, 5 Drawing Figures

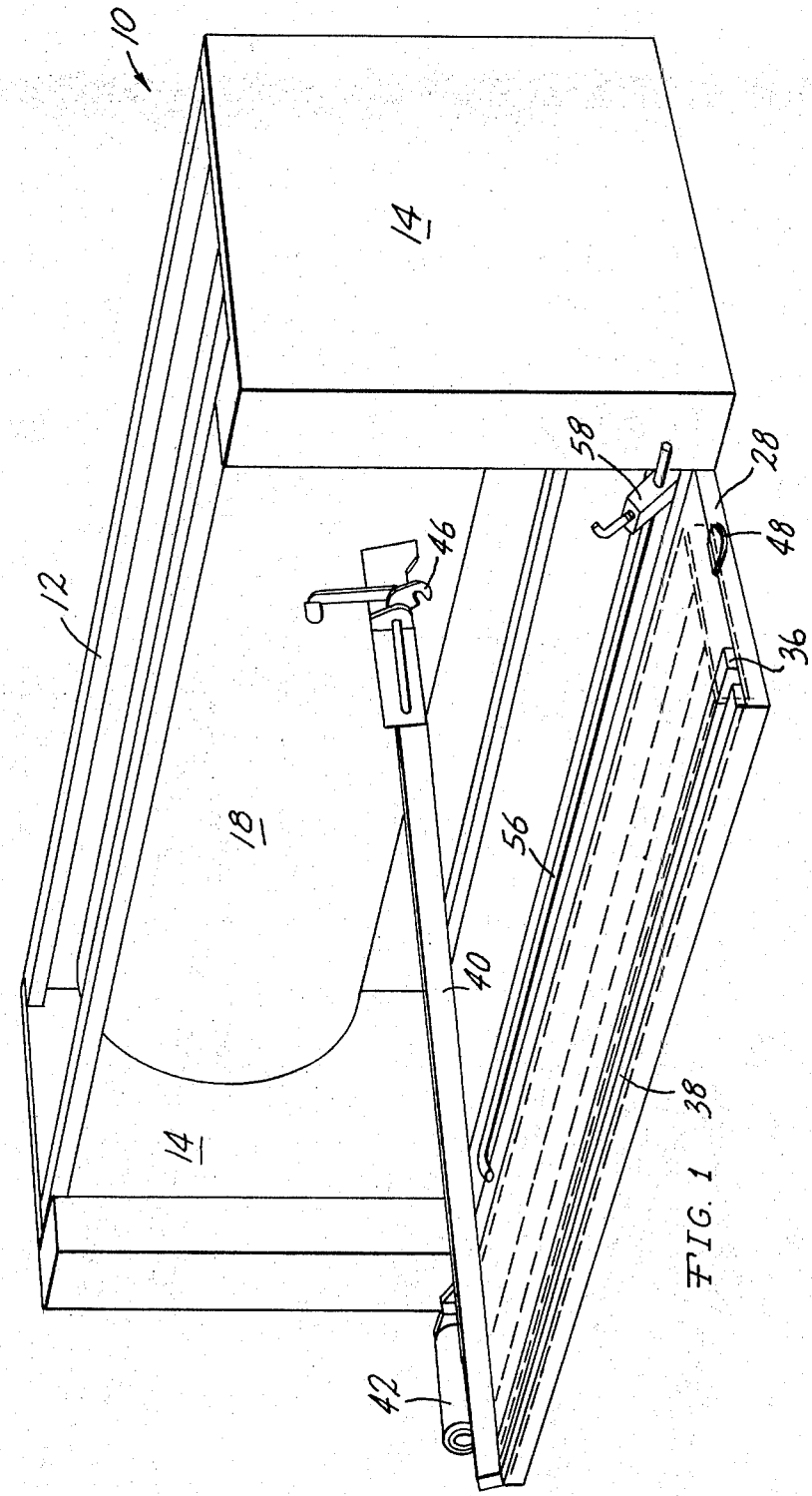

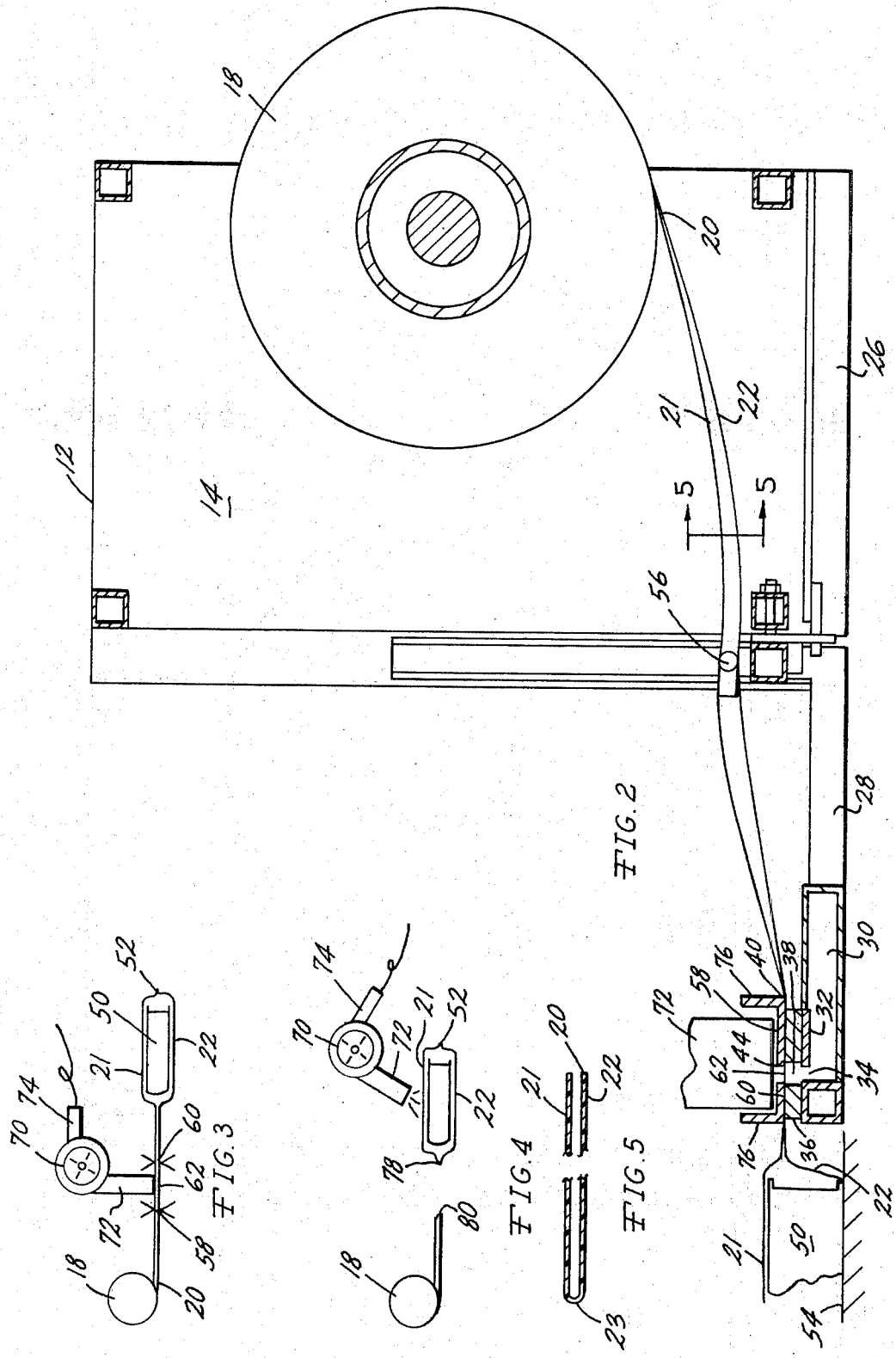

SHRINK WRAPPING SYSTEM

BACKGROUND OF THE INVENTION

Various mechanisms are presently in use for applying shrink film to articles that are to be wrapped. Shrink film is a well known material that shrinks when heated. Apparatus for shrink wrapping thus consists essentially of machinery capable of sealing an article to be wrapped within a shrink film. When the film is heated, it shrinks into conformed engagement with the article.

Previously available shrink wrapping equipment employed a hot wire, hot knife or ultrasonic energy source for cutting and trim sealing the film during wrapping. By trim sealing is meant heat sealing the layer so as to form a seam concurrently with trimming the layers. These methods can be objectionable with certain films because inadequate control results in charring and a release of noxious gases due to a breakdown in the film. In addition, these methods did not provide for a sufficiently strong bond between the layers of film that are cut. Accordingly, it is an object of the present invention to provide an improved method and apparatus for shrink wrapping and trim sealing.

SUMMARY OF THE INVENTION

In the present invention, layers of film from a supply roll are placed on opposite sides of the article to be wrapped, and the layers are clamped in a film severing and bonding assembly, the function of which is to enable severing of film from the roll and bonding of the edges of the layers. The severing and bonding assembly consists of a fixed support bar having a slot therein and a movable clamp bar which is hinged to the fixed bar and is movable between a release position spaced from the fixed bar and a clamp position clamping the layers of film between the bars. The clamp bar has a slot which is aligned with the support bar slot so that when the layers of plastic film are clamped therebetween, the plastic is accessible through the clamp bar slot. The frame on which the supply roll is mounted has a base which forms a manifold that communicates with the support bar slot.

The severing and bonding assembly functions to firmly restrain the plastic layers on opposite sides of the slots. A suitable mechanism such as a manually manipulated hot air gun is then used to direct heated air or other gas against the areas of the plastic films that are accessible through the clamp bar slot. Sufficient hot gas is then dynamically forced through the film to cause the film to shrink an amount necessary to pull the film apart along a line extending in the area within the slot. The plastic layers on opposite sides of the line are also fully heat bonded together by the heated air that is utilized to sever the layers. Thus, the method and apparatus of this invention provides for both efficient severing of the layers and simultaneous bonding of the layers together. The above sequence can then be repeated to fully seal the article between the two films. Heated air is then directed against the film which surrounds the article to cause it to shrink into conformity with the article.

By virtue of the simplicity of the method and apparatus of this invention, a shrink wrapping machine according to this invention can be embodied in small, portable and inexpensive apparatus capable of efficient use to shrink wrap articles.

Importantly, this invention concurrently severs and seals multiple layers of plastic film in an improved manner. The concepts disclosed herein for severing and sealing are shown incorporated in portable apparatus, but it will be apparent that these concepts are also usable in large scale machinery of any type that utilizes plastic film having restrained shrink characteristics. Thus, the apparatus utilized in this invention for concurrently cutting and sealing multiple layers of plastic film has general utility outside the specific apparatus disclosed herein.

Further objects, features and advantages of this invention will become apparent from a consideration of the following description, the appended claims, and the accompanying drawing in which:

FIG. 1 is a perspective view of the apparatus of this invention;

FIG. 2 is a sectional view of the apparatus of this invention;

FIGS. 3 and 4 are diagrammatic views illustrating the method of this invention; and FIG. 5 is a fragmentary sectional view illustrating two layers of film in the form in which they are removed from the supply roll in the apparatus of this invention.

With reference to the drawing, the shrink wrapping system of this invention is illustrated in FIG. 1 as including portable film applying apparatus 10. The apparatus 10 consists of a main frame 12 having end walls 14 which support a roller 16 on which a roll 18 of shrink film 20 is mounted. The material 20 is a shrinkable film that is manufactured so that when it is heated it will contract dramatically. One commercially available form of film 20 is marketed by Reynolds Metals Company of Richmond, Virginia under the trademark REYNOLON. In a preferred form of the invention, the film 20 on the roll 18 is in a folded form so that it consists of two layers 21 and 22 (FIG. 5) connected along one of their edges by a fold 23.

The main frame 12 also includes a base 26 which has a forward extension 28 that terminates in a hollow manifold 30. A portion 32 of the top wall which forms the manifold 30 constitutes a fixed position support bar which extends the full width of the frame 12, as shown in FIG. 1. The support bar 32 is formed with a narrow longitudinally extending slot 34 for a purpose to appear presently. A compressible gasket member 36 is positioned on and is secured to the top side of the support bar 32, the gasket 36 having a slot 38 that is aligned with the slot 34.

A clamp bar 40 (FIGS. 1 and 2) is pivotally connected at one end by a hinge assembly 42 to the base extension 28. The clamp bar 40, by virtue of its hinged mounting, is movable between the release position shown in FIG. 1 in which it is spaced from the support bar 32 and a clamp position, shown in FIG. 2, in which the bar 40 is engaged with the gasket 36. The bar 40 also has a slot 44 which is aligned with the slot 34. A pivoted latch assembly 46 carried by the clamp bar 40 is engageable with a latch plate 48 on the extension 28 to releasably lock the clamp bar 40 in its clamping position shown in FIG. 2.

In the use of the apparatus 10, assume that it is desired to wrap an article, such as the book indicated at 50 in FIG. 3, in the film 20. Further assume that the free end of the film 20 on the roll 18 has the layers 21 and 22 heat bonded together by a weld indicated generally at 52 in FIG. 3. A length of film 20 is wound off the roll 18 so that enough film 20 is available at a position adjacent the manifold 30 to enable the book 50 to be inserted between the layers 21 and 22 and disposed on a supporting surface 54 adjacent the manifold 30. To facilitate spreading of the layers 21 and 22 apart, a spreader rod 56 is adjustably mounted on a support block 58 carried by the frame 12. The film 20 is initially trained over the bar 56 so that the layers 21 and 22 will be spread, as shown in FIG. 2 to facilitate insertion of book 50 between layers 21 and 22.

The layers 21 and 22 are positioned on the gasket 36 with the clamp bar 40 in its release position shown in FIG. 1. The clamp bar 40 is then moved downwardly to its clamping position shown in FIG. 2 and the clamp assembly 46 is manipulated to retain the clamp bar 40 in this position. As best appears in FIGS. 2 and 3, sections 58 and 60 of the film 20 on opposite sides of the aligned slots 34, 38 and 44 are gripped between the bars 32 and 40. This gripping constitutes a firm restraint that precludes movement of the film sections 58 and 60 toward each other. This provides an area 62 of film 20 that is aligned with the slots and is accessible through the clamp bar slot 44.

A conventional manually operable hot air gun 70 (FIG. 3) is then positioned so that its discharge nozzle 72 is adjacent and overlies the slot 44 in the clamp bar 40. The handle 74 of the gun 70 is then manipulated so as to move the nozzle 72 back and forth along the slot 44. Upturned flanges 76 on the clamp bar 40 confine the nozzle 72 and guide the nozzle during its back and forth movement so that the hot air from the gun 70 is directed against the film area 62. This hot air that passes through the film, travels into the manifold 30 and returns through the slots 34 and 44 so as to further heat the area 62 of film 20. The subjection of the film 20 to hot air from the gun 70 causes the section 62 of film to contract sufficiently to pull itself apart along a line extending longitudinally of the slot 44 thereby severing the layers 21 and 22 at the slot 44. Simultaneously, the edges of the layers 21 and 22 formed by the severing operation are thermally bonded together so as to form the welds shown at 78 and 80 in FIG. 4. The book 50 is now partially enclosed between the layers 21 and 22, the welds 52 and 78 being on two sides and the fold 23 on a third side. The book 50 is then rotated 90°, the clamp bar 40 is moved to its release position, the roll of film 18 is retracted so as to locate the weld 80 somewhere between support bar 32 and the separator bar 56, and the layers 21 and 22 on the fourth side of the book 50 is positioned on the gasket 36. The above procedure is then repeated so as to form a third weld so that the book 50 is totally enclosed within the film 20.

Finally, the film 20, in which the book 50 is enclosed, is subjected to heat from the gun 70, as shown in FIG. 4, so as to cause the film 20 to shrink into engagement with the external surface of the book 50. The film 20 will shrink sufficiently to conform it to the external shape of the book 50.

From the above description it is seen that this invention provides an improved system for shrink wrapping which is advantageous because it enables use of the portable apparatus 10 and in addition provides for an improved wrap. The welds 78 and 80 formed by the method of this invention wherein the plastic film is constrained at 58 and 60 and the area 62 therebetween is heated sufficiently to cause it to pull itself apart are welds that are superior from the standpoint of strength.

In the present invention, the restrained shrink characteristic of the plastic film is utilized to effect the simultaneous severing and bonding of multiple layers of the film. The film is restrained on opposite sides of the slot 44 so that only a narrow area 62 of the film is exposed in the slot 44. By narrow is meant that there is not room for any structure in the space between the restrained portions of the film. The space above and below the slot 44 is unrestricted to enable flow of hot gases therethrough. The forcing of the hot gases through the film area 62 provides for rapid heating and consequent shrinking and tearing of the film area 62 along a desired line. Since the heat is dynamically applied to the film area 62, and the heat zone is very narrow, the temperature of the hot gases is not critical. It is only necessary that the temperature be high enough to heat the film to a bonding temperature.

It will be readily apparent to those skilled in the art that the above described concepts in applicants' invention involving providing a narrow film area 62 and dynamically forcing hot gases therethrough has general utility outside the specific apparatus illustrated in the drawing. For example, these concepts could be satisfactorily incorporated in continuous or other heat sealing and cutting machinery.

What is claimed is:

1. Apparatus for concurrently cutting and sealing multiple layers of plastic film, said apparatus comprising a fixed position support member having a narrow unrestricted slot therein, means providing a supply of film in multilayer form located so that layers of said film are positioned in overlying relation with said slot, means clamping said film at opposite sides of said slot comprising a clamp member movable between a release position spaced from said support member and a clamp position adjacent said support member and capable of clamping said layers of film between said members, said clamp member having a slot therein aligned with said support member slot and providing access to the area of film clamped between said members, and means dynamically forcing hot gas through the film between said slots in sufficient quantity and at a sufficiently high temperature to cause said film to shrink and thereby pull itself apart and heat seal the edges of said layers on opposite sides of the pulled apart area.

2. Apparatus according to claim 1 further including means on said support member providing a manifold communicating with said slot in said support member.

3. Apparatus according to claim 1 wherein said means providing said supply of film comprises a frame supporting said members and a roll of said film mounted on said frame.

* * * * *